May 10, 1955      A. C. PETERSON      2,708,004

FLUID OPERATED GUIDING MEANS

Filed June 25, 1952      2 Sheets-Sheet 1

INVENTOR

Adolphe C. Peterson.

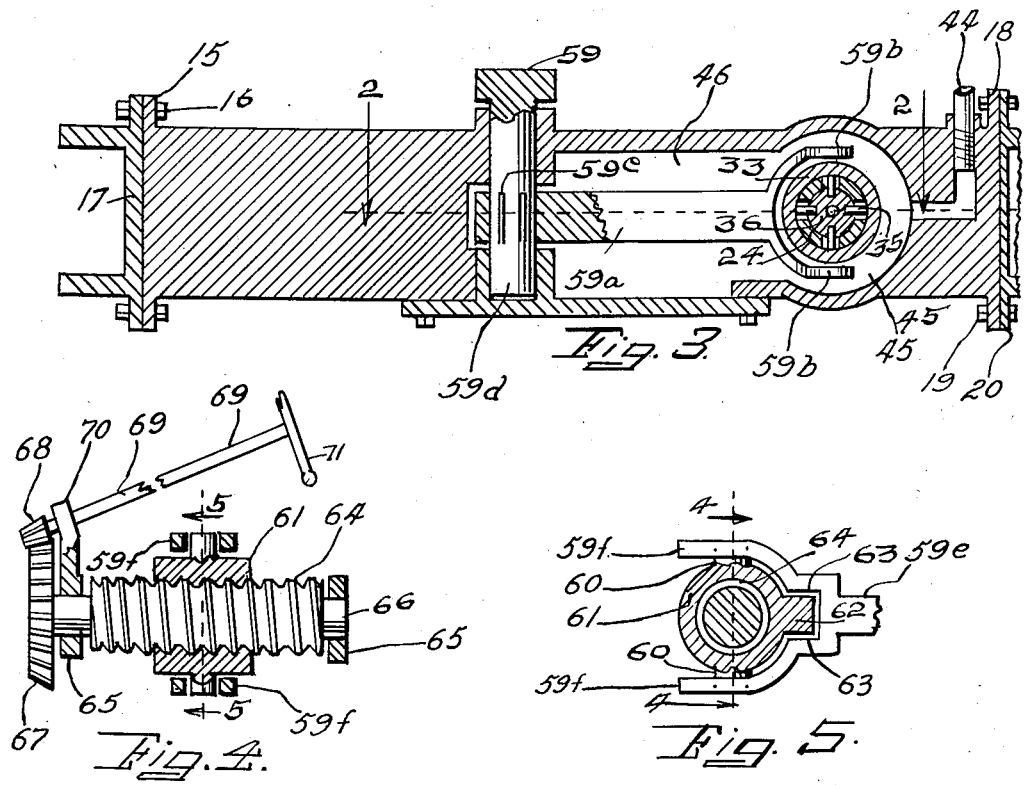
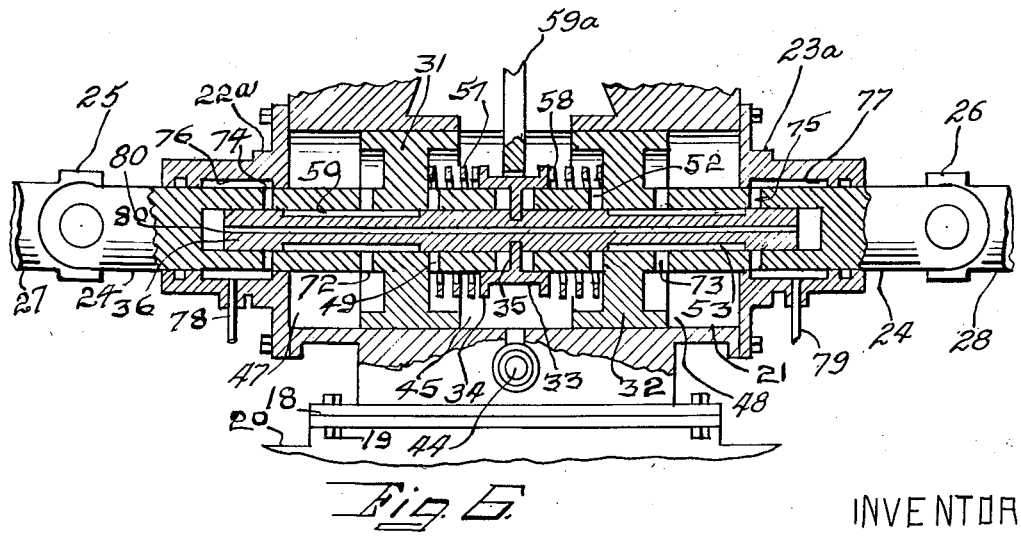

United States Patent Office 2,708,004
Patented May 10, 1955

2,708,004

FLUID OPERATED GUIDING MEANS

Adolphe C. Peterson, Minneapolis, Minn.

Application June 25, 1952, Serial No. 295,475

9 Claims. (Cl. 180—79.2)

My invention relates to guiding means for automotive vehicles such as operated by fluid pressure means, and it is therefore called fluid operated guiding means.

The principal objects of my invention are to provide an improved form of guiding or steering means for automotive vehicles, especially the passenger automobile, which means shall be simple and relatively cheap in manufacture, efficient in operation, and which shall be such that manual guiding means may become instantly effective in the event of any failure of the fluid operated guiding means. Such fluid operated or hydraulic operated steering means, as have been used, are relatively complicated, and do not have generally a completely dual form of steering such that each form is effective to procure guiding and stabilization of the driving wheels in travel. An object of this invention is to combine the guiding means, fluid operated, with the wheel supporting construction, in such a way, that the result is a cheaper and more simple form of construction. An object is to provide a simple form of directly effective hydraulic or fluid pressure control for the guiding wheels of an automobile, in conjunction with the steering effect by manual control, so that this directly effective hydraulic guiding procures increased stability for the front wheels in travel. In general the object is to improve upon fluid pressure operated guiding or steering means for automotive vehicles.

The principal devices and combinations of devices comprising my invention, are as hereinafter described and as defined in the claims. In the accompanying drawings which illustrate my invention, like characters refer to like parts throughout the several views.

Referring to the drawings:

Figure 3 is a view in vertical section at right angles to that of Figure 2, on the lines 3—3 of Figures 2 and 1, some parts being shown in full side elevation.

Figure 4 is a detail vertical section, on the line 4—4 of Figures 1, 2, and 5, some parts broken away, some in full side elevation, this view showing, diagrammatically, also, the hand wheel and sterring post, for manually guiding the vehicle, this hand wheel being not shown in other views.

Figure 5 is a detailed vertical section, on the line 5—5 of Figures 2 and 4, this section being at right angles to the section of Figure 4.

Figures 1, 2:
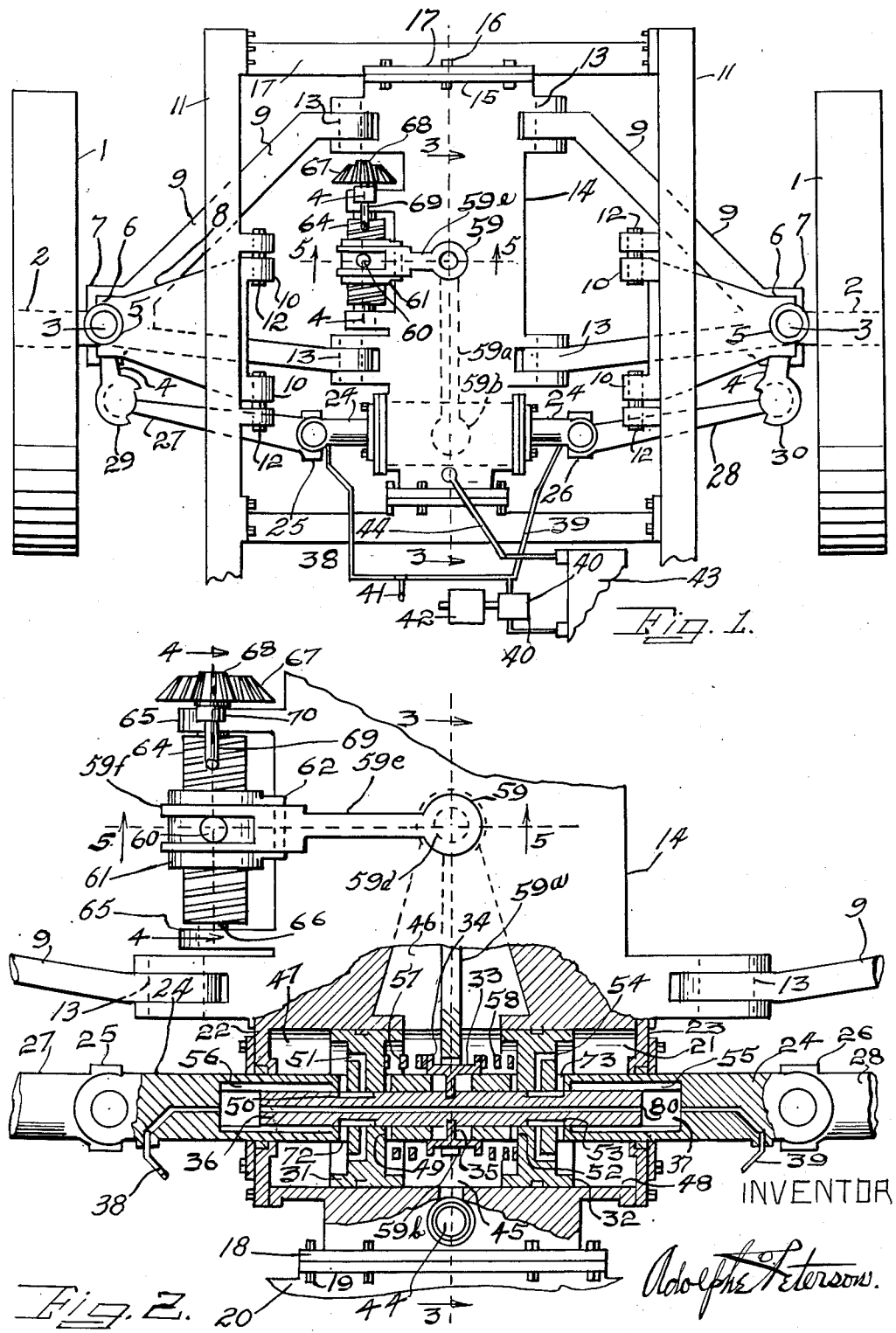
Figure 1 is a plan view of the front end of a chassis of an automobile, showing the front wheels, wheel supporting means or brackets for the wheels, and a general plan view of the apparatus forming my guiding means.
Figure 2 is a view on a scale approximately twice that of Figure 1, to show the especial fluid actuating means, this being principally a horizontal section, through the fluid pressure actuating means and its valve means, some parts being shown in plan view (as in Figure 1) some parts being broken away, the section being on the line 2—2 of Figure 3.

Figure 6 is a view of a slightly modified form of the control valve 36 in piston rod 24, the section being on a line similar to the section of Fig. 2, this modified control valve being usable with all other parts as in Figs. 1 and 2.

Referring first chiefly to Figure 1, this view shows the front end of the chassis and shows the road wheels 1, of the vehicle chassis, wheel spindles 2 (in dotted lines), vertical pivotal mounting posts 3 to which the wheel spindles are attached, guiding cranks or levers 4 formed with the pivotal mounting posts 3, hinges or fulcrums by which the wheel spindles and posts are attached to wheel supporting arms, the hinges attaching the upper post bearings 5 denoted 6, the hinges attaching the lower post bearings denoted 7. The wheel supporting arms 8, the upper, and 9 the lower, mount the road wheels 1 by the hinges described. All of these parts as above detailed are such as are generally used in automotive vehicles, and are not more in detail described inasmuch as they are commonly known and used, and they are shown as of one type, in diagrammatic fashion, to indicate their use with the apparatus hereafter described, and it should be understood, that they may be of any type as commonly used.

The upper wheel supporting arms 8 are attached by the trunnion brackets 10 to side rails 11 of the chassis, the arms being hinged at points 12. These arms 8 are shorter than arms 9. The supporting arms 9 are each at their inner ends, attached by hinges 13 two for each arm, to the opposite sides of a control mounting plate 14 which serves the triple purpose of forming a support for the hinges 13, forming in it a mounting for a control lever, and forming in it the cylinder for the actuating piston means.

The control mounting plate 14 is in general form a rectangular horizontally placed mounting plate having at its extreme forward end a flanged part 15 by which it is attached by bolts 16 to transverse chassis member 17, and having at its extreme rearward end a vertical flanged part 18 by which it is attached by bolts 19 to the transverse chassis member 20 so that thus the control mounting plate is firmly supported as a part of the vehicle chassis and in turn supports the wheel supporting arms 8 and 9 and thereby supports the road wheels 1. The yieldable spring supporting means commonly used with such means, is not shown, as it is contemplated that such yieldable means by which the chassis is yieldably supported is or may be of any commonly used form.

The control mounting plate 14 has formed in it by boring through it, a horizontally placed cylinder bore 21 the axis of which lies in a horizontal plane approximately at the level of the steering crank arms or levers 4 and is on an axis extended transversely of the vehicle chassis at right angles to the direction of forward travel of the chassis. This cylinder bore 21 is closed at both of its opposite ends by cylinder heads 22 and 23, respectively, and through each of these the opposite ends of the piston rod 24 is extended and has at each opposite end universal joints 25 and 26, respectively fixed on it and these universal joints 25, 26 respectively universally join to the piston rod at the opposite ends, the semi-tie rods or crank rods 27, 28, respectively, and one of the latter is joined by ball and socket joint 29 (or any universal joint) to the crank arm 4 of one road wheel and the other is joined by ball and socket joint (or any universal joint) 30 to the crank arm 4 of the other road wheel 1. Thus the two road wheels are joined together for steering by their crank arms 4 and a common tie-rod formed by the semi-tie rods or crank rods 27 and 28 and the common connecting piston rod 24. The movement of these parts 24, 27, 28 determines the movement of the steering road wheels 1, as tie-rods usually do, i. e. as a unit means.

The common piston rod 24 has formed on it or firmly fixed to it to move axially with the piston rod 24, two pistons 31 and 32, respectively, each reciprocable, as one unit, with piston rod 24, in the cylinder bore 21. These two pistons are separated as shown a short distance and intermediately of the pistons there is mounted slidably on the mid-portion of the piston rod 24 to slide a very short distance axially of it, either way a collar bearing sleeve 33 having two collars 34, one at each end fixed on it or formed on it, and the sleeve has also formed with it or fixed to it to slide with it inwardly projecting posts 35 which project into as many sockets formed, in a cylindrical valve 36 which latter is slidable a very short distance relatively and axially within a bore formed in the mid-portion of the piston rod 24. This bore denoted 37 is closed at each of its extreme opposite ends but at its extreme opposite ends may have discharge of fluid as liquid through flexible discharge conduits 38 and 39, respectively, the attached ends of which will move with the piston rod in its reciprocation and provide a discharge route for liquid after the liquid performs its actuating function. The discharge conduits 38 and 39 discharge back to a pressure supply pump 40 and the latter may also receive any required additional supply of liquid by means of supply conduit 41. The liquid pump 40 is operated by any motor means 42 or in any manner. This pump may be the usual lubricating supply pump or any hydraulic liquid supply means or fluid supply means, as means supplying air under pressure (if it is desired that air or gaseous fluid be used as the actuating fluid).

The pump 40 delivers under pressure to pressure reservoir 43 and the latter may deliver under pressure at any time through conduit 44 to the space 45 intermediately of the pistons 31, 32 in cylinder bore 21. The liquid under pressure will normally fill this space and other connected space 46 interiorly of control mounting plate 14. The pressure fluid may flow into the spaces 47 or 48 on the opposite sides of the pistons 31, 32, alternatively, as controlled by the valve 36 which may be called a control valve. The flow of the pressure fluid in the one case (for one direction of steering) is through ports 49 in the related piston to ports 50 in the control valve, then through a port 51 to the related opposite space on the opposite side of the piston 31, or in the other case (for the other direction of steering) it may flow through the port 52 in the related piston, then through port 53 in control valve 36, then through port 54 in the piston rod 24 to the related opposite side of the piston 32. In the first case the space on the opposite side of the piston 32 will discharge through port 53 in control valve 36, then through passages 55 formed interiorly of piston rod 24 and then by way of space in the related end of the valve bore to one discharge conduit 39. In the second case, or alternative case, the space on the opposite side of the other piston will discharge through port 50 in the control valve to passages 56 formed interiorly of piston rod 24 and thereby to space in the valve bore and thereby to a discharge conduit 38.

The control valve, it will be seen, in Figure 2, will move either way only a very short distance, say even less than one-eighth or one-sixteenth of an inch, or as required but preferably not more than about one-eighth inch to one-quarter inch either way from its intermediate or neutral position. The neutral position is normally secured, when there is no manual steering control torque, by means of two coil springs placed about piston rod 24 intermediately of the pistons 31, 32 one being between one piston and one collar 34 and the other being between the other piston and the other collar 34. These springs 57—58 are of equal strength so that they keep the control valve intermediately located, normally. Pressure from manual control will move the collar sleeve 33 either way against tension of the compression springs mentioned, 57 and 58, and such movement will by the inward posts 35 move the control valve 36 the same direction relatively to the piston rod 24 within which the control valve is located.

In such control movement relatively, either way, the alternative connections for flow, as above described, are achieved. This control movement, either way, axially of control valve 36, is secured by means of a steering crank lever generally denoted 59 and which has one arm 59a interiorly of control mounting plate 14 in space 46, this arm 59a having at its outer or swinging end a bifurcated part having rather large diameter, horizontally disk-shaped members 59b which approximately fill the space from one side to the other between collars 34 of sleeve 33 so that movement either way procures movement of sleeve 33 and collars 34 and posts 35, instantly. The inner end of arm 59a is rotationally fixed by tongue and groove elements 59c to oscillate pivot pin 59d and at the top of the latter, on the upper exterior side of control mounting plate 14, there is formed with the pivot pin 59d (or securely fixed thereto) the other arm 59e of the steering crank lever 59, and the latter extends at right angles horizontally to arm 59a and at its extreme outer end has formed with it the bifurcated members 59f, each of which is in turn bifurcated, and includes between its members one of the lugs 60 which are formed on opposite sides of the worm-block 61. The latter has also formed with it a radially horizontally projecting lug 62 which is placed between opposite contacting parts 63 of the arm 59e so that thereby the worm block 61 is held against rotation on the worm 64, which is axially interiorly of worm block 61, and on which the worm block 61 may be moved axially in either direction by turning of worm 64.

The worm 64 is rotatably mounted in bearing fixtures 65 formed on control mounting plate 14 and its shaft 66 at one end has fixed thereon the slightly beveled gear 67, and the latter is in permanent engagement with bevel gear 68, which is fixed on manual steering post 69, which in turn is rotatably held in bearing 70 or other bearing fixtures and is rotatable in either direction for manual steering direction by means of the manual steering wheel 71. The steering post 69 may be of any length such that the manual steering wheel 71 is in a suitable location in the chassis. The ports 72 and 73 in the piston rod 24 cooperate with the ports 50 and 53, respectively, to procure the discharging function. The bore in the intermediate portion of the piston rod 24 wherein the control valve 36 may have oscillation through a very short distance, is shown as closed by the metal of the piston rod 24, at both ends, but this closure of the formed bore in piston rod 24 may be closed in any way after the forming of the bore, as by parts welded in or otherwise inserted to be held in place. The parts of the structure are shown in such way as will best facilitate explanation and description or illustration of the parts with regard to their relative functioning. The piston rod 24, in particular, may be formed in such parts as may be convenient for manufacture and assembly, and the pistons 31 and 32 may be formed and united with the piston rod 24 in any manner to facilitate assembly and manufacture. The steering wheel 71 is shown as relatively small in the illustration, and it should be understood that this is for illustration in the limited space available, and that the proportions should be such as are best suited for the particular function. Sleeve 33 and collars 34 may be split and secured together.

Referring now to Figures 1 to 5, the general operation is now more generally described. The spaces 45 and 46 and the spaces 47, 48, and connecting conduits are filled with an operating fluid as lubricating oil, preferably, and the reservoir 43 is also supplied with that oil. When the control valve 36 is in its normal relative position, as shown in Figure 2, the ports of the control valve 36 through which the oil might flow, are closed, and there is then no flow, and the locking of the oil in the spaces mentioned, serves to lock the pistons 31, 32 and piston rod 24, in the normal intermediate position whereby the road wheels 1 are then locked in the straight ahead positions. If the driver desires a turn in either direction by road wheels 1, he then turns the steering wheel 71 in the desired direction, and by this action, the worm 64 is turned to move worm block 61 and the control lever 59 in the desired way, and this results in movement of collar sleeve 33 in the desired direction, so that a spring 57 or 58 is first compressed and co-incidently the internal posts 35 moves control valve 36 in the desired direction, and thereby the oil under pressure in space 45 and reservoir 43 flows through opened ports of piston rod 24 (or the pistons) and the associated ports 50 or 53, into a space 47 or 48 on the opposite side of one piston 31 or 32 and co-incidently oil flows away from the space 47 or 48 of the other end of the cylinder bore 21 through passages 55 or 56 and by way of discharge conduits 38 or 39 back to pump 40 and reservoir 43. It will be noted that pump 40 is always operated by any motor means 42 or any other means to create pressure of liquid in reservoir 43 and spaces 45, 46. As soon as either movement one way or the other of control valve 36 relative to piston rod 24 and pistons 31—32 is procured by the driver, the pressure of oil on one side of the two-piston assembly 31—32 will create impulsion on the piston rod 24 in the desired direction and cause movement in the desired direction of piston rod 24, carrying with it semi-tie rods or connecting rods 27 and 28 as a unit with piston rod 24 and pistons 31—32, so that steering cranks 4 are similarly moved to turn road wheels 1 in the desired direction. As soon as the driver stops movement of the steering wheel 71 the control valve 36 becomes fixed relative to piston rod 24 in whatever position it may be, relatively to cylinder bore 21, and thus piston rod 24 moves rightwardly or leftwardly, under power of the oil under pressure, to the extent that the driver turns his wheel 71 in either direction. He procures a return to normal straight ahead position in the same manner by turning his wheel 71 in a reverse direction until the straight ahead position, the position of the parts shown, is again procured. In the event that there is any failure of the oil pressure or any failure of parts, in any way, the movement of lever arm 59a may force the collar sleeve 33 and posts 35 against piston rod 24 (space for movement of posts 35 being limited) and thereby piston rod 24 and connecting rods 27, 28 may be manually moved for steering or guiding of the road wheels 1, and the vehicle chassis. Posts 35 are in slots in piston rod 24.

Referring now to Figure 6, which shows a slightly modified form of the control valve and its ports, and a modified form of return of the liquid oil from the spaces 47 and 48, there is shown in Figure 6 only the parts directly relating to the control valve and pistons 31, 32 and piston rod 24. The piston rod 24 is connected as in the first form with the connecting rods or semi-tie rods 27, 28, and operates the road wheels 1 by these rods, as in the first form. The lever 59 and the parts which operate it, worm 64, gears 67, 68, worm block 61 and pins 60, steering wheel post 69 and wheel 71, are all as in the first form, so that of these parts only part of lever arm 59a is shown. This arm 59a is operated as in the first form and operates or moves control valve 36 axially relative to piston rod 24 and pistons 31, 32, as in the first form, and posts 35, as in the first form, will after the short initial movement, either way, contact the abutting or adjacent edges or piston rod 24 (at ends of the slots wherein posts 35 move axially) and then as pistons 31, 32 are moved with piston rod 24 by action of the fluid pressure, either way, will move further along with piston rod 24, if the driver continues further turning movement manually upon the steering wheel 71. It will be seen by reference to Fig. 6 (as also by reference to Fig. 2) that control valve 36 and posts 35, and collar sleeve 33, can move only approximately the distance necessary to open passage through the ports, in either direction, and that any movement thereafter, after contact, will be as a unit with the piston rod 24 and pistons 31, 32, and connecting rods 27, 28.

In this form, Fig. 6, the piston rod 24 has the ports 49, and 52, and the ports 72 and 73, and the control valve 36 has the ports 50 and 53, substantially, as in the first form, except that ports 50 and 53 are relatively longer. Piston rod 24 does not have the long axially parallel passages 56, 55, as in the first form, but instead has the short ports 74 and 75, near opposite ends of piston rod 24, and these ports 74, 75, respectively, permit flow by way of ports 50 and 53, from the respective spaces 47 and 48, to annular, relatively long ports 76, 77, respectively, and that flow from the latter ports 76, 77 is uninterrupted or unrestricted, to the discharge conduits 78, and 79, respectively, the latter conduits in this form being fixed, unmoving conduits, rather than flexible moving conduits as in the first form. The ports 74, 75 are always open to annular ports 76, 77, so that whenever the ports 50 or 53, by movement of the control valve 36, either way, come into transverse alignment with ports 74 or 75, flow from spaces 47 or 48, is permitted. When this connection for flow is made either way, the other of ports 50 and 53 comes into alignment with ports 49 (in one direction of movement) or with ports 52, in the other direction of movement, whereby flow of the pressure fluid from space 45, through ports 49 or ports 52, is permitted. In either form of my device, there is a small passage or bore 80 formed longitudinally and axially of the control valve 36 from end to end, so that at any time the spaces within piston rod 24 at the ends of the control valve 36 beyond it, either way, are connected by this passage 80 for flow of liquid to equalize pressures at either end of the control valve 36. If the flow, in any construction, by way of supply conduit 41, to or from any supply source, for oil, is unrestricted, the passage 80 in the first form may be omitted. Ports 76, 77 are in heads 22a, 23a.

It will be seen, that in either form, the movement of the piston rod 24 and pistons 31, 32, and connecting rods 27, 28, is locked against movement in any direction from the normal position relatively to the control valve 36, by the locking of fluid in the spaces 47, 48, and that the cooperation of worm 64 and worm block 61 also performs a locking function, preserving the status until the steering wheel 71 is manually moved out of the position it then occupies, whether that position be the position for straight ahead travel or turning movement. Movement of the steering wheel 71, either way, instantly moves block 61 and results in movement of control valve 36, relatively to piston rod 24, to thus effect unlocking and initiation of power steering action in either selected direction of turning movement.

While I have shown particular devices and combinations of devices in the illustration of my invention, I contemplate that other detailed devices and combinations may be utilized in the realization without departing from the spirit and contemplation thereof.

What I claim is:

1. A fluid operated means for steering actuation comprising: a supporting structure forming a part of a vehicle structure and a pair of wheel spindle structures having pivotal steering mounting on said supporting structure for steering pivoting of said wheel spindle structures about the steering axes in said steering mounting; a pair of road wheels mounted one on each spindle structure and each spindle structure having an affixed crank lever for turning the spindle on its steering axis; a pair of link-rods one pivotably connected at one end to one of the crank levers and the other connected at one end to the other crank lever; an intermediate link common to the two link-rods and slidable in relatively fixed bearings transversely of the direction of travel of the vehicle and in a horizontal plane; each of the said link-rods having pivotable connection, at ends opposite to their connections with the crank levers, with the intermediate link; a relatively fixed cylinder having its axis in a plane substantially horizontal and extended in a direction transversely of the direction of travel of the vehicle; a piston means formed as a part of and fixed with the said intermediate link and reciprocable within the said cylinder; a source of fluid under pressure and a conduit means for flow of fluid therefrom to either of opposite sides of said piston means; a conduit means for discharge of fluid from either side of said piston means; a control means manually movable and associated with said conduit means to permit flow from said pressure source to either selected side of said piston means and co-incidently to permit flow from the opposite side of said piston means; the said control means comprising a valve means axially of said piston means and intermediate link, and port means in said intermediate link and port means in said valve means, one port means cooperable with the other port means when the valve means is moved either way from a normal position, the said valve means having a normal position relative to said intermediate link and its said piston means to interrupt cooperation of said port means.

2. The combination of claim 1 in which said control means includes a control lever that is interconnected with the valve means to effect initial movement of the valve means relative to the intermediate link and its said piston means, said control lever including means interconnecting with the intermediate link to effect impulsion by contact with said intermediate link after said initial movement.

3. The combination of claim 1 in which said control means includes a control lever that is interconnected with the valve to effect initial movement of the valve means relative to the intermediate link and its piston means, said control lever including means interconnecting with the intermediate link to effect impulsion by contact with said intermediate link after said initial movement, and cooperating worm and block means one element of which is interconnected with said control lever means to move it and the other of which is interconnected with a steering lever means or equivalent.

4. All of the means as described and as claimed in claim 1 and in combination; a right-angled control lever pivotally mounted on a relatively fixed pivot and having interconnection by one of its arms with the said valve means to procure movement of said valve means relatively to said intermediate link and its said piston means and having interconnection by its other arm with a worm block, a worm interassociated with said worm block to procure movement of said worm block in the direction axially of said worm, a manually directable steering lever or equivalent interconnected with said worm to procure turning of said worm in either direction on its axis according to the movement of said steering lever.

5. All of the means as described and as claimed in claim 1 and in combination: a right angled control lever pivotally mounted on a relatively fixed pivot and having interconnection by one of its arms with the said valve means to procure movement of said valve means relatively to said intermediate link and its said piston means and having interconnection by its other arm with a worm block, a worm inter-associated with said worm block to procure movement of said worm block in the direction axially of said worm, the first named arm including means to contact the said intermediate link after limited relative movement either way from the normal relative position to effect impulsion either way of the intermediate link when the said valve means has moved either way to a position effecting the said port cooperation.

6. All of the means as described and claimed in claim 1 and in combination; the said supporting structure including an intermediate common member and arms horizontally extended therefrom to each wheel spindle structure and pivotally connected to the wheel spindle structure and at the inner ends pivotally connected to the said intermediate common member; the said intermediate common member having said fixed cylinder affixed to its side, a space internally of said intermediate common member and a space intermediate the opposite ends of said piston means; a control lever pivotally mounted in said last named spaces in bearing means formed in said intermediate common member said control lever having an arm extending into said intermediate space in said piston means, the said valve means being movable parallel with said piston means and axially thereof and having interconnection with the lever arm internally of the common member, the said control lever pivotally mounted having affixed to it externally of said common member a second lever arm, a worm block with which said second lever arm is interconnected, a worm actuably interconnected with said worm block, and a manually actuated steering lever means actuably connected with said worm to turn it in accordance with manually induced impulsion of said steering lever means.

7. All of the means as described and as claimed in claim 1, and in combination; the said control means comprising also, a lever pivotably mounted on a pivot fixed relative to the said cylinder, the said lever extending through an aperture in the side of said cylinder into an intermediate portion of said piston means and interactuably connected with the said valve means for thrusting of the said valve means in either direction axially, and manually manipulable steering means interconnected with the said lever for movement thereof in either direction oscillatively on its pivot.

8. All of the means as described and as claimed in claim 1, and in combination; the said control means comprising also, a lever pivotably mounted on a pivot fixed relative to the said cylinder, the said lever extending through an aperture in the side of said cylinder into an intermediate portion of said piston means and interactuably connected with the said valve means for thrusting of the said valve means in either direction axially, yieldable means for maintenance of the said valve means normally in its mid-station relative to said piston means, the said lever in the event of failure of said fluid pressure source having potential inter-engagement with said intermediate link and piston means when the said valve means is moved to the full extent of its limited relative movement either direction away from the normal station of the said valve means relative to the said piston means.

9. All the means as described and as claimed in claim 1, and in combination; the said control means comprising also, a lever pivotably mounted on a pivot fixed relative to the said cylinder, the said lever extending through an aperture in the side of said cylinder into an intermediate portion of said piston means and interactuably connected with the said valve means for thrusting of the said valve means in either direction axially, yieldable means for maintenance of the said valve means normally in its mid-station relative to said piston, the said lever in the event of failure of said fluid pressure source having potential inter-engagement with said intermediate link and piston means when the said valve means being capable of movement in either direction away from its normal station relative to the said piston means, manually manipulable steering means interconnected with the said lever for movement thereof in either direction oscillatively on its pivot, the said last named means including a rotatable worm and a worm block in co-actuation therewith, the said worm-block having inter-connection with the said lever for directional actuation thereof, about its pivot.

References Cited in the file of this patent

UNITED STATES PATENTS

| | | |
|---|---|---|
| 867,282 | Macfarren | Oct. 1, 1907 |
| 1,775,176 | Stokes | Sept. 9, 1930 |
| 2,152,021 | Baumer | Mar. 28, 1939 |
| 2,321,377 | French | June 8, 1943 |
| 2,363,179 | Harrington et al. | Nov. 21, 1944 |

FOREIGN PATENTS

| | | |
|---|---|---|
| 354,327 | Great Britain | Aug. 4, 1931 |
| 567,506 | Germany | Apr. 20, 1933 |